Sept. 11, 1945.  A. BOYNTON  2,384,437
PRESSURE GAUGE FOR PNEUMATIC TIRES
Filed April 20, 1943

ALEXANDER BOYNTON,
INVENTOR,
BY Albert F. Dieterich
ATTORNEY.

Patented Sept. 11, 1945

2,384,437

UNITED STATES PATENT OFFICE 2,384,437

PRESSURE GAUGE FOR PNEUMATIC TIRES

Alexander Boynton, San Antonio, Tex.; Sida S. Martin executrix of said Alexander Boynton, deceased Application April 20, 1943, Serial No. 483,785

10 Claims. (Cl. 73—81)

My invention relates to pressure gauges for pneumatic tires.

The principal object is to ascertain the pressures within pneumatic tires by a gauge removably attachable to the exterior surface of the tires.

Another object is to avoid using the valved openings of inner tubes for the double purpose of forcing compressed air thereinto from a hose and of checking the value of the pressure by a gauge attached to the same opening, in which separate operations it is necessary to remove the hose to apply the gauge and vice versa.

Another object is to cause the two operations of forcing air into pneumatic tires and of gauging the value thereof to be done simultaneously and more quickly than can be done by two operations performed one after the other.

In carrying out the foregoing objects, I employ a light hand-operated clamp for compressing a sector of the tire, which sector is converted into a diaphragm, the force of which acts against a graduated rod showing the pressure obtaining within the tire, as will be understood more clearly by an examination of the following specification and the accompanying drawing, in which—

Similar characters of reference are employed to designate similar parts throughout the several views.

Figure 1:
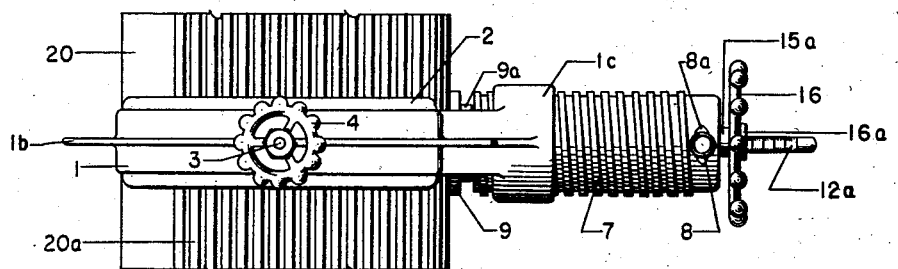
Fig. 1 is a top plan view of the gauge illustrated in Fig. 2.
Figure 2:
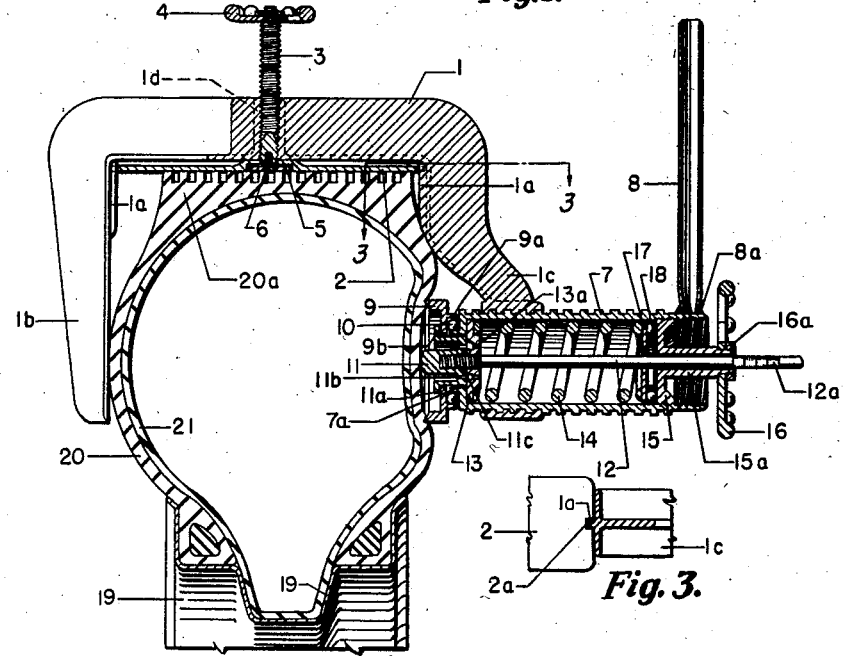
Fig. 2 is a radial section through the preferred construction.
Figure 3:
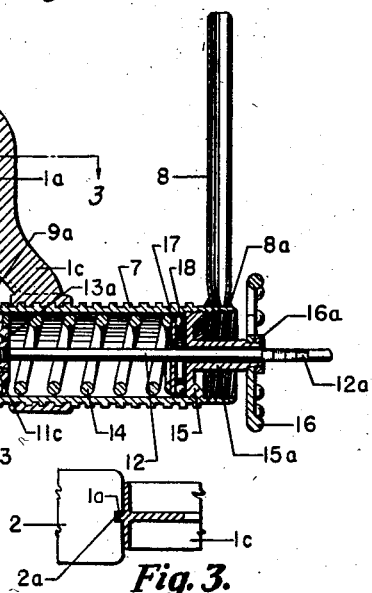
Fig. 3 is a detailed cross section on the line 3—3, Fig. 2.

In Fig. 2, illustrating the preferred construction, the clamp frame 1 is adapted to be fitted over the tire 20, mounted upon the rim 19 and having within it the conventional inner tube 21. The arm 1b extends somewhat past the center of the tire; while the arm 1c supports the shell 7 opposite the centers of tires of different sizes by means of the adjusting plate 2, which may have its position adjusted relative to the tire tread 20a by the rod 3, having threaded connection through the boss 1d of the frame 1. This rod, which has the handle 4 secured upon its outer end, is secured independently rotatable to the plate 2 by means of the washer 5, received within a recess of the plate, and the screw 6, having threaded connection with the rod 3. This rod has a slight annular shoulder near its inner end, causing the plate 2 to have small clearance between the washer 5 and the larger threaded portion of the rod. The plate 2 has the end slots 2a (see Fig. 3), within which the ribs 1a of the frame 1 are received with slight clearance, in order to guide the plate and prevent it from rotating as it is moved adjustably by the rod 3 in adapting the gauge to be fitted upon tires of different sizes, so that the cup 9 may be positioned opposite the thin side walls of the tires.

The shell 7, having the operating handle 8 secured upon its outer end by the weld 8a, has threaded connection through the arm 1c. The cup 9 has its inner end annularly beveled to a sharp edge adapted to become embedded within the side wall of a pneumatic tire. This cup is secured in alignment with the shell 7 by means of the contact shoe 11 and the spring shoe 13, both of said shoes having threaded connection with the rod 12, to which the shoe 11 may be secured further by the weld 11c.

The shell 7, the rod 12, and the shoe 11 may be locked together as a unit by screwing the spring shoe 13 firmly against the plate-like portion of the contact shoe 11. The annular flange 11a of the contact 11, having slight clearance with the cup 9, secures this cup upon the contact shoe 11. The balls 10, confined between the annular flange 9a of the cup 9 and the annular flange 7a of the shell 7, provide a bearing between the shell 7 and the cup 9, in order that this cup will not be rotated against the tire while the shell 7 is being rotated by the handle 8 in establishing proper contact between the cup and the tire, as will be explained under "Operation."

It will be observed that the shoe 11 is adapted, by reason of its limited outward projection beyond the cup 9, to deflect the isolated sector of the tire 20 embraced by the cup 9 a distance equal to only slightly more than two graduations of the rod 12. This provides that the graduations 12a may be set by turning the spring adjusting handle 16 so as to show noticeable movement of the graduations when the desired pressure obtains within the tire, the slight clearance 9b between the cup 9 and the flange 11a providing for this limited outward movement.

The coiled spring 14, installed under some compression and having slight clearance within the shell 7, has one end engaged upon the spring shoe 13 and the other end upon the washer 17 which engages the thrust bearing 18 upon the spring adjusting plate 15, which plate is threadedly engaged within the shell 7 for the purpose of regulating the spring force transmitted to the contact shoe 11. The washer 17 and the bearing 18 provide that the compression of the coiled spring 14 may be adjusted by turning the plate 15 with a minimum of torque resistance from the spring. The tubular extension 15a of the plate 15, having a central opening through which the rod 12 is slidable, has the spring adjusting handle 16 secured upon its outer end by the nut 16a.

The graduations 12a of the rod 12 will indicate the force required to compress the spring 14.

The position and the spacing of these graduations is determined initially by placing the gauge upon a tire and by marking each graduation so as to cause it to register with the outer end of the nut 16a at the pressure within the tire indicated by such registration. When marking the graduations, the cup 9 should be pressed against the tire and deform it to a predetermined degree by turning the handle 8 so as to drive the shell 7 inwardly a predetermined distance, that is, a predetermined number of turns after the cup 9 first contacts the tire in its normal expanded position.

The openings 11b and 13a provide free egress for air entrapped between the cup 9 and the tire, in order that the diaphragm sector of the tire embraced by the cup will act with all its force upon the shoe 11.

*Operation of Fig. 2*

The frame 1 being clamped upon a tire and the tire being deformed as shown in Fig. 2, the sharp edge of the cup 9 will become imbedded slightly within the tire and thereby will isolate the sector of the tire embraced by the cup, thus converting this isolated sector into a diaphragm acting upon the contact shoe 11 which transmits the force of that contact to the rod 12 and the graduations 12a.

Figures 4, 5:
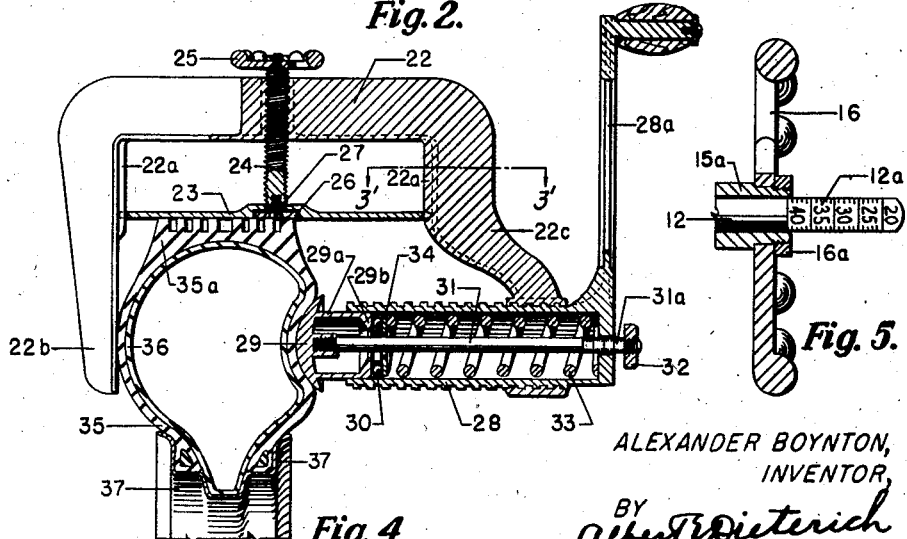
Fig. 4 is a radial section through a modified construction of the gauge illustrated in Fig. 2.
Fig. 5 is an enlarged detailed view showing the pressure indicating graduations and the handle which controls the spring force.

If, for illustration, it is desired to place 40 pounds of air within a deflated tire, the handle 16 will be turned until the graduation 39 is in registration with the outside edge of the nut 16a, as appears in Fig. 5. Then, the handle 8 will be turned three rotations, for example, after the cup 9 contacts the tire, it being understood that three rotations represent the same deformation of the tire as when the graduations 12a were marked originally. Air will be turned now into the tire in the conventional manner. Whenever the graduation indicating 39 moves slightly and the next graduation 40 appears, then 40 pounds of air will have been placed in the tire.

Attention is directed to the fact that the clearance 9b will permit the isolated diaphragm sector of the tire embraced by the cup 9 to flex outward more than far enough to move the rod 12 until the next graduation will appear to indicate that the pressure within the tire has increased above that at which the gauge was set at beginning of the inflation operation. Manifestly, the gauge will show no change until the pressure indicated by the gauge as set has increased, it being understood that this setting preferably should be such as one or two pounds less than the pressure to be placed in the tire.

When the pressure within the tire has increased enough to flex the diaphragm sector outward to the limit of its travel, the gauge will record no further increases in pressure.

If, through failure of the operator to observe the gauge as it records the first pound or two of increased pressure, the pressure should exceed the limit of pressure desired, the inner tube valve may be opened and the gauge observed again. Then when the graduations 12a begin to move inward, the exact pressure within the tire will be indicated. If, when the cup has been placed in proper contact with the tire, a greater pressure is indicated than that desired, it is obvious that compressed air within the tire may be relieved in the usual manner until the gauge records the desired pressure.

The gauge is adapted to be placed upon tires of different sizes. In Fig. 2, the gauge is applied to the largest sized tire for which it is adapted. Fig. 4, while illustrating a somewhat different construction, employs a similar clamp frame which shows how the gauge in Fig. 2 may be employed upon smaller tires than the one shown in that figure.

It will be understood that the section 3'—3' in Fig. 4 corresponds in form to the section 3—3 in Fig. 2, but these sections are distinguished by priming one of them to avoid possible confusion due to the fact that the parts cut by these sections are indicated by different reference characters.

The modified construction illustrated in Fig. 4 differs from that shown in Fig. 2 in that the shoe 29 compresses a sector of the tire without isolating the sector compressed by means such as the cup 9 which is employed in the preferred construction. The force acting upon the shoe 29 therefore will be exerted by the pressure under the whole deformed area of the tire. Consequently, the construction in Fig. 4 will be not quite as accurate when employed upon tires of greatly varying sizes as will be the construction illustrated in Fig. 2, but, nevertheless, will be quite accurate when employed upon tires of the same size as that for which the graduations were marked.

In Fig. 4, the clamp frame 22 has the arms 22b and 22c adapted to embrace the tire 35 mounted upon the rim 37 and has within it the inner tube 36.

The adjusting plate 23, having a slot at either end freely receiving the ribs 22a of the frame 22, is adjustable by means of the rod 24 threadedly engaged through a boss of the frame and having the handle 25 secured upon it. The washer 26 is secured upon the end of the rod 24 by the screw 27. The plate 23 is adapted to be forced downward by a small annular shoulder at the end of the threads upon the rod, in order that the plate will contact the tire thread 35a.

The shell 28, having threaded connection through the arm 22c, is slidable over the tubular extension 29a of the shoe 29. The rod 31, having the graduations 31a, has threaded connection with the shoe 29 and extends slidably through the outer closed end of the shell 28. The nut 32 upon the rod 31 serves to limit the expansion of the spring 33, which is installed under some compression within the shell 28. One end of the spring engages the closed end of the shell and the other end engages the washer 34 by which the thrust bearing 30 is impinged upon the flange 29b of the shoe 29. The handle 28a, which may be cast integrally with the shell 28, serves as a convenient means for quickly turning the shell in order to force the shoe 29 to deform a sector of the tire 35, as appears. After the shoe makes contact with the tire the shell 28 is turned until the shoe 29 reaches the position shown in Fig. 4, i. e., until the shoe has deformed a section of the tire and the tire has contacted substantially the full area of the face of the shoe. This tire is shown relatively small, as compared to the tire 20 in Fig. 2, for the purpose of illustrating the adaptability of both gauges for use upon tires of different sizes.

The spring 33 is adapted to be compressed a predetermined distance by a predetermined force exerted upon the shoe 29. This force is indicated by the graduations 31a when a sector of the tire has been deformed by a certain number of turns of the handle 28a after the shoe 29 contacts the tire.

*Operation of Fig. 4*

If it be assumed that the graduated scale 31a shows the force exerted upon the spring by the tire at different pressures within it, then it is apparent that a deflated tire may be inflated to any desired pressure within the range of the scale by attaching an air hose to the inner tube valve and then removing it when the gauge indicates the desired pressure.

From the foregoing specification it is apparent that the cup employed in Fig. 2 and the shoe employed in Fig. 4 are full equivalents of each other when employed to deform a tire for the purpose of ascertaining the pneumatic pressure within the tire whenever the force required to accomplish all of the deformation, as contradistinguished from such force as relates to a diaphragm only, is gauged in terms of the pneumatic pressure within the tire. Such a gauge as this is made as the result of deformation tests upon tires in conjunction with an ordinary pressure gauge, the reading of the latter gauge being indicated upon the former gauge so as to accomplish the translation.

Manifestly, this invention may be varied greatly by substituting mechanical equivalents for parts shown without departing from the invention as herein disclosed.

I claim:

1. In a pressure gauge for pneumatic tires: a clamp frame having a pair of arms adapted to receive a pneumatic tire between them; a shell threadedly engaged through one of said arms; means for adjusting said frame upon the treads of tires of different sizes so that said shell will be opposite the central portion of the side wall of each such tire; a cup upon said shell, said cup having a sharp beveled annular inner end adapted to become embedded within the side wall of a pneumatic tire and isolate the portion thereof so embraced; a thrust bearing between said cup and shell; a rod co-axially with and in part located within said shell and extending in part outward thereof; a contact shoe upon said rod; a spring shoe upon said rod within said shell; a spring in said shell; a spring adjusting plate threadedly engaged within said shell and adapted to compress said spring; a thrust bearing between said plate and spring; a handle upon said shell for moving said shell to urge said cup to embed within the side wall of said tire to isolate a portion thereof so that such isolated portion will press outwardly upon said contact shoe; and graduations upon said rod to indicate the force exerted by said shoe upon said isolated portion.

2. In a pressure gauge for pneumatic tires: a clamp frame having a pair of arms adapted to receive a pneumatic tire between them; a shell threadedly engaged through one of said arms; means for adjusting said frame upon the treads of tires of different sizes so that said shell will be opposite the central portion of the side wall of each such tire; a cup upon said shell, said cup having a sharp beveled annular inner end adapted to become embedded within the side wall of a pneumatic tire and isolate the portion thereof so embraced; a rod co-axial with and in part located within said shell and extending in part outward thereof; a contact shoe upon said rod; a spring shoe upon said rod within said shell; a spring in said shell; a spring adjusting plate threadedly engaged within said shell and adapted to compress said spring; means upon said shell for moving said shell to urge said cup to embed within the side wall of said tire to isolate a portion thereof so that such isolated portion will press outwardly upon said contact shoe; and means to indicate the force exerted by said shoe upon said isolated portion.

3. In a pressure gauge for pneumatic tires: a clamp frame engageable upon pneumatic tires of different sizes; a shell threadedly engaged therewith; means for adjusting said frame upon the treads of tires of different sizes so that said shell will be opposite the central portion of the side wall of each such tire; a cup upon said shell, said cup having a sharp beveled annular inner end adapted to become embedded within the side wall of a pneumatic tire and isolate the portion thereof so embraced; a contact shoe carried by said shell; a spring adapted to urge said shoe upon said tire; means including said shell to urge said cup to embed within the side wall of said tire to isolate a portion thereof so that such isolated portion will press outwardly upon said contact shoe; and means for gauging the force of said isolated portion upon said contact shoe.

4. In a pressure gauge for pneumatic tires: a cup having its open end beveled to a sharp edge; means for urging said cup to embed said sharp edge within the wall of a pneumatic tire and isolate a portion of said wall to act as a diaphragm; a contact shoe located within said cup; yieldable means urging said shoe outwardly of the cup and into engagement with the diaphragm-acting portion of the tire; and means extending into the cup and cooperating with said shoe for indicating the force required to cause deflection of said diaphrgam-acting portion of the tire.

5. In a pressure gauge for pneumatic tires: a clamp frame having a pair of arms adapted to receive a pneumatic tire between them; a shell adjustably engaged through one of said arms; an adjusting plate slidable between said arms and adapted to engage the tread of said tire; a rod secured to said plate and rotatable relative thereto, said rod having threaded engagement through said frame and being adapted to position said shell relative to the side wall of a tire; a cup carried by said shell, said cup being adapted to embed within the outer wall of a tire and convert a portion thereof into an isolated diaphragm; a contact shoe carried by said shell; a spring in said shell operatively connected with said contact shoe and being adapted to urge said shoe to deflect said diaphragm independently of the remainder of the tire; thrust bearings between said shell and said cup, said bearings being to provide for free rotation of said shell relative to said cup; and means for indicating the pressure required to deflect said diaphragm.

6. In a pressure gauge for pneumatic tires: a clamp frame adapted to be secured upon tires of different sizes; a shell threadedly engaged through said frame; a handle upon said shell for moving said shell relative to said tires; a shoe having a portion thereof slidable within said shell; a spring within said shell, said spring urging said shoe toward a tire being tested for pressure therein; and a rod attached to said shoe, said rod extending through said shell and spring and having a pressure indicating scale thereon to record the force of compressed air within said tire.

7. In a pressure gauge for pneumatic tires: a clamp frame adapted to be secured upon tires of different sizes; a shell threadedly engaged through said frame; a handle upon said shell for moving said shell relative to said tires; a shoe having a portion thereof slidable within said shell; a spring within said shell, said spring urging said shoe toward a tire being tested for pressure therein; and means cooperating with said shell for indicating the force of air within said tire.

8. In a pressure gauge for pneumatic tires: a tire clamp; a shell threadedly engaged in said clamp; a spring operatively positioned in said shell; a shoe adapted to be actuated by said spring and shell to urge said shoe upon said tire; and means for indicating the pressure of said shoe upon said tire to determine the pressure of air within said tire.

9. In a pressure gauge for a pneumatic tire: adjustable clamping means adapted to embrace a portion of a tire; means carried by said clamping means to deflect inwardly of the tire and isolate a portion of the wall of said tire and convert the same into a diaphragm, said adjustable clamping means providing for the isolation of said diaphragm in predetermined spaced relation to the tread of said tire, said diaphragm being itself deflectable by air pressure within the tire; and means engaged by said diaphragm when deflected for indicating the force required to effect deflection of the diaphragm.

10. In a pressure gauge for a pneumatic tire: an adjustable clamping means including a clamp frame and adjustable means engaging the tread of the tire for positioning the frame on the tire; means carried by the frame and forming a part of the clamping means for deforming a portion of the side wall of the tire, said means that engages the tread of the tire serving to position said deforming means at a predetermined distance from the tread of the tire; and means for indicating the pressure within the tire required to balance the force required to effect the deformation of the side wall by said deforming means.

ALEXANDER BOYNTON.